United States Patent
Chen et al.

(10) Patent No.: US 9,340,758 B2
(45) Date of Patent: May 17, 2016

(54) COMPOSITIONS OF HYDROCHLOROFLUOROOLEFINS

(71) Applicants: Benjamin Bin Chen, Wayne, PA (US); Philippe Bonnet, Lyons (FR); Maher Y. Elsheikh, Wayne, PA (US); Brett L. Van Horn, King of Prussia, PA (US); Laurent Abbas, Narberth, PA (US)

(72) Inventors: Benjamin Bin Chen, Wayne, PA (US); Philippe Bonnet, Lyons (FR); Maher Y. Elsheikh, Wayne, PA (US); Brett L. Van Horn, King of Prussia, PA (US); Laurent Abbas, Narberth, PA (US)

(73) Assignee: Arkema Inc., King of Prussia, PA (US)

( * ) Notice: Subject to any disclaimer, the term of this patent is extended or adjusted under 35 U.S.C. 154(b) by 159 days.

(21) Appl. No.: 13/772,505

(22) Filed: Feb. 21, 2013

(65) Prior Publication Data

US 2014/0057826 A1 Feb. 27, 2014

Related U.S. Application Data

(62) Division of application No. 12/990,307, filed as application No. PCT/US2009/043538 on May 12, 2009, now abandoned.

(60) Provisional application No. 61/052,285, filed on May 12, 2008.

(51) Int. Cl.
*C11D 7/50* (2006.01)

(52) U.S. Cl.
CPC ............ *C11D 7/5018* (2013.01); *C11D 7/5081* (2013.01)

(58) Field of Classification Search
CPC .......... C08J 9/127; C08J 9/149; C11D 7/5018

USPC .......................................................... 510/407
See application file for complete search history.

(56) References Cited

U.S. PATENT DOCUMENTS

| | | | |
|---|---|---|---|
| 7,183,448 B2 | 2/2007 | Nakada et al. | |
| 7,438,825 B1 | 10/2008 | Chen et al. | |
| 7,438,826 B1 | 10/2008 | Chen et al. | |
| 7,479,238 B1 | 1/2009 | Chen et al. | |
| 8,338,355 B2 | 12/2012 | Ishihara et al. | |
| 2005/0033097 A1 | 2/2005 | Tung et al. | |
| 2006/0142173 A1 | 6/2006 | Johnson et al. | |
| 2007/0007488 A1 | 1/2007 | Singh et al. | |
| 2008/0207788 A1* | 8/2008 | Bowman et al. | ............... 521/131 |
| 2010/0102272 A1* | 4/2010 | Basu et al. | ................ 252/182.12 |
| 2010/0112328 A1* | 5/2010 | Van Horn et al. | .......... 428/304.4 |

FOREIGN PATENT DOCUMENTS

| | | |
|---|---|---|
| WO | WO 99/02615 | 1/1999 |
| WO | WO 02/02728 A1 | 1/2002 |
| WO | WO 2007/053673 A2 | 5/2007 |
| WO | WO 2009/089511 A2 | 7/2009 |
| WO | WO 2009/089511 A3 | 7/2009 |
| WO | WO 2010/062572 A2 | 6/2010 |

* cited by examiner

*Primary Examiner* — Gregory Webb
(74) *Attorney, Agent, or Firm* — Steven D. Boyd

(57) ABSTRACT

The present invention relates to solvent/cleaner and heat transfer fluid compositions comprising at least one hydrochlorofluoroolefin (HCFO), 1-chloro-3,3,3-trifluoropropene (HCFO-1233zd), particularly the trans-isomer. The HCFO of the present invention can be used in combination with co-agents including, hydrofluorocarbons (HFCs), hydrofluoroolefins (HFOs), hydrocarbons, ethers including hydrofluoroethers (HFEs), esters, ketones, alcohols, 1,2-transdichloroethylene and mixtures thereof.

14 Claims, No Drawings

COMPOSITIONS OF HYDROCHLOROFLUOROOLEFINS

The present application is a divisional application of U.S. application Ser. No. 12/990,307 filed Oct. 29, 2010; and International application serial number PCT/US09/43538 filed May 12, 2009 which designated the United States; and U.S. provisional application Ser. No. 61/052,285 filed May 12, 2008.

SUMMARY OF INVENTION

The present invention relates the use of at least one hydrochlorofluoroolefin (HCFO) as a solvent/cleaning composition or as heat transfer fluids. Solvent/cleaning applications can be, for example, to clean electronic circuit boards such as in defluxing operations. The HCFO of the present invention is HCFO-1233 including but are not limited to, 1-chloro-3,3,3-trifluoropropene (HCFO-1233zd), preferably the trans-isomer of HCFO-1233zd alone or in a combination. The HCFO of the present invention can be used in combination with co-agents including, hydrofluorocarbons (HFCs), hydrofluoroolefins (HFOs), hydrocarbons, ethers including hydrofluoroethers (HFEs), esters, ketones, alcohols, 1,2-transdichloroethylene and mixtures thereof.

BACKGROUND OF INVENTION

The Montreal Protocol for the protection of the ozone layer, signed in October 1987, mandated the phase out of the use of chlorofluorocarbons (CFCs). Materials more "friendly" to the ozone layer, such as hydrofluorocarbons (HFCs) eg HFC-134a replaced chlorofluorocarbons. The latter compounds have proven to be green house gases, causing global warming and were regulated by the Kyoto Protocol on Climate Change, signed in 1998. With the continued concern over global climate change there is an increasing need to develop technologies to replace those with high ozone depletion potential (ODP) and high global warming potential (GWP). Though hydrofluorocarbons (HFCs), being non-ozone depleting compounds, have been identified as alternative solvents/cleaners agents and heat transfer fluids to chlorofluorocarbons (CFCs) and hydrochlorofluorocarbons (HCFCs), they still tend to have significant GWP.

SUMMARY OF INVENTION

It was discovered that a solvent/cleaning and heat transfer composition comprising the hydrochlorofluoroolefin HCFO-1233, preferably 1-chloro-3,3,3-trifluoropropene (HCFO-1233zd) and more preferably the trans isomer of HCFO-1233zd alone or in a combination provides effective solvent/cleaning and heat transfer activity while being of negligible ozone depletion potential (ODP), low global warming potential (GWP) and exhibits low toxicity.

DETAILED DESCRIPTION OF INVENTION

The present invention relates to solvent/cleaning and heat transfer fluid agents with negligible ozone-depletion and low GWP comprising a hydrochlorofluoroolefin (HCFO) used alone or with additional co-agents. In a preferred embodiment of this invention the HCFO is 1-chloro-3,3,3-trifluoropropene (HCFO-1233zd), preferably the trans isomer, alone or with one or more co-agents. Preferred co-agents to be used with the HCFO include (a) hydrofluorocarbons including but not limited to difluoromethane (HFC32); 1,1,1,2,2-pentafluoroethane (HFC125); 1,1,1-trifluoroethane (HFC143a); 1,1,2,2-tetrafluoroethane (HFC134); 1,1,1,2-tetrafluoroethane (HFC134a); 1,1-difluoroethane (HFC152a); 1,1,1,2,3,3-heptafluoropropane (HFC227ea); 1,1,1,3,3-pentafluoropropane (HFC245fa); 1,1,1,3,3-pentafluorobutane (HFC365mfc) and 1,1,1,2,2,3,4,5,5,5-decafluoropentane (HFC4310mee), 1,1,1,2-tetrafluoroethane; (b) hydrofluoroolefins including but not limited to tetrafluoropropenes (HFO1234), trifluoropropenes (HFO1243), all tetrafluorobutene isomers (HFO1354), all pentafluorobutene isomers (HFO1345), all hexafluorobutene isomers (HFO1336), all heptafluorobutene isomers (HFO1327), all heptafluoropentene isomers (HFO1447), all octafluoropentene isomers (HFO1438), all nonafluoropentene isomers (HFO1429), (cis and/or trans)-1,2,3,3,3-pentafluoropropene (HFO-1225ye), (c) hydrocarbons including but not limited to, pentane isomers, butane isomers, and hexane isomers, (d) C1 to C5 alcohols such as methanol, ethanol, and iso-propanol, C1 to C4 aldehydes, C1 to C4 ketones, C1 to C4 ethers and diethers, ester such as methyl formate, methyl acetate, ethyl formate, ethyl acetate, 1,2-transdichloroethylene and carbon dioxide, (e) HCFOs such as 2-chloro-3,3,3-trifluoropropene (HCFO-1233xf) and dichlorotrifluoropropene (HCFO1223); and mixtures thereof. The co-agents may comprise from about 1% to about 40% of the composition of the present invention. When an alcohol is used as a co-agent, it preferably comprises from about 2% to about 15% of the composition.

The HCFO-1233zd of the present invention is preferably, predominantly the trans isomer of HCFO-1233zd.
Trans (E) and cis (Z) isomers are illustrated:

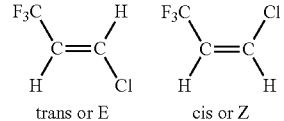 [SMILES: FC(F)(F)/C=C/Cl ; FC(F)(F)/C=C\Cl]

trans or E     cis or Z

A major portion of the HCFO-1233zd of the present invention is the trans isomer. It was discovered that the trans isomer exhibits a significantly lower genotoxicity in AMES testing than the cis isomer. A preferred ratio of trans and cis isomers of HCFO-1233zd is less than about 30% weight of the combination of the cis isomer, and preferably less than about 10% of the cis isomer. The most preferred ratio is less than about 3% of the cis isomer. Further, it was discovered that the trans isomer has a Kauri-butanol value which indicates efficacy as a solvent while the Kauri-butanol value of HCFO-1233xd could not be measured via ASTM D1133 "Standard Test Method for Kauri-Butanol Value of Hydrocarbons". The preferred Kauri-butanol value of the composition of the present invention is above 15 and preferably above 20.

The composition of the present invention can be used as a heat transfer fluid in systems such as air conditioning, heat pump and refrigeration applications. The vapor compression cycle is one of the most commonly used type methods to accomplish cooling or heating in a refrigeration system. The vapor compression cycle usually involves the phase change of the refrigerant from the liquid to the vapor phase through heat absorption at a relatively low pressure and then from the vapor to the liquid phase through heat removal at a relatively low pressure and temperature, compressing the vapor to a relatively elevated pressure, condensing the vapor to the liquid phase through heat removal at this relatively elevated pressure and temperature, and then reducing the pressure to start the cycle over again.

While the primary purpose of refrigeration is to remove heat from an object or other fluid at a relatively low temperature, the primary purpose of a heat pump is to add heat at a higher temperature relative to the environment.

Two of primary measures of the performance of refrigerant are capacity and efficiency. The capacity is the amount of cooling that the refrigerant can produce for a given volumetric flow rate and is important for sizing of the refrigeration equipment, among other things. HCFO-1233zd that is predominantly the trans-isomer was discovered to provide greater refrigerant capacity than the cis-isomer of HCFO-1233zd.

The composition of the present invention also provides methods of removing containments from a product, part, component, substrate, or any other article or portion thereof by applying to the article a composition of the present invention i.e. solvent/cleaning applications and system flushing applications. For the purposes of convenience, the term "article" is used herein to refer to all such products, parts, components, substrates, and the like and is further intended to refer to any surface or portion thereof. Furthermore, the term "contaminant" is intended to refer to any unwanted material or substance present on the article, even if such substance is placed on the article intentionally. For example, in the manufacture of semiconductor devices it is common to deposit a photoresist material onto a substrate to form a mask for the etching operation and to subsequently remove the photoresist material from the substrate. The term "contaminant" as used herein is intended to cover and encompass such a photo resist material.

Air conditioning and refrigeration flushing agents are used to remove oil, debris, sludge, residue, etc. from refrigeration and Air conditioning systems such as from condensers and evaporators. A flushing agent should have good solvent properties, be compatible with system components (O-rings, seals, etc.), be safe, non-flammable, and easy to use, dry quickly and leave no residue that could cause problems later on. CFC-11 and HCFC-141b have been used as flushing solvents hut are subject to phase-out due to their ozone depleting nature. HFC-245fa is used as a flushing agent but lacks sufficient solvency to be an effective flushing agent for some applications, such as for refrigeration or air conditioning systems using mineral oil. Blends of HFC-245fa with trans-1,2-dichloroethylene (TDCE) can be used where additional solvency is required but TDCE is flammable and may not be compatible with components of some systems.

E-1233zd is an effective non-flammable, safe to handle, flushing agent that has sufficient solvency to be used in a wide range of air conditioning and refrigeration flushing needs, including in both open-loop and closed-loop systems and with all commonly used refrigeration lubricants including mineral oil, alkylbenzene oil, polyol ester oil, polyalkylene glycols, polyvinyl ethers, polyalpha olefins, and the like. E-1233zd can also be easily removed from the refrigeration or AC system following flushing without leaving behind problematic residue.

When used as a flushing agent, Z-1233zd is more difficult to remove from the refrigeration or air conditioning system than E-1233zd, greatly increasing the risk of excessive residue remaining in the system. This may compromise the performance of the refrigeration or air conditioning system during operation and is less safe due to the increased toxicity of Z-1233zd. Z-HCFO-1233zd is also less desirable than E-1233zd as a flushing agent in open-loop systems where the risk of exposure to the operator with the flushing agent is particularly high.

The flushing agent of the present invention is that of HCFO-1233zd preferably predominantly E-1233zd.

Preferred solvent/cleaning methods of the present invention comprise applying the present composition to an article/system, with vapor degreasing and solvent cleaning methods being particularly preferred for certain applications, especially for intricate parts and difficult to remove soils. Preferred vapor degreasing and solvent cleaning methods consist of exposing an article, preferably at room-temperature, to the vapors of a boiling solvent. Vapors condensing on the object have the advantage of providing a relatively clean, distilled solvent to wash away grease or other contamination. Such processes thus have an additional advantage in that final evaporation of the present solvent composition from the object leaves behind relatively little residue as compared to the case where the object is simply washed in liquid solvent.

For applications in which the article includes contaminants that are difficult to remove, it is preferred that the present methods involve raising the temperature of the solvent/cleaner composition of the present invention above ambient or to any other temperature that is effective in such application to substantially improve the cleaning action of the solvent/cleaner. Such processes are also generally preferred for large volume assembly line operations where the cleaning of the article, particularly metal parts and assemblies, must be done efficiently and quickly.

In preferred embodiments, the solvent/cleaning methods of the present invention comprise immersing an article to be cleaned in liquid solvent/cleaner at an elevated temperature, and even more preferably at about the boiling point of the solvent. In such operations, this step preferably removes a substantial amount, and even more preferably a major portion, of the target contaminant from the article. This step is then preferably followed by immersing the article in solvent/cleaner, preferably freshly distilled solvent, which is at a temperature below the temperature of the liquid solvent in the preceding immersion step, preferably at about ambient or room temperature. The preferred methods also include the step of then contacting the article with relatively hot vapor of the present solvent/cleaner composition, preferably by exposing the article to solvent/cleaner vapors rising from the hot/boiling solvent/cleaner associated with the first mentioned immersion step. This preferably results in condensation of the solvent/cleaner vapor on the article. In certain preferred embodiments, the article may be sprayed with distilled solvent/cleaner before final rinsing. Examples include but are not limited to oxygen service parts cleaning and etc.

In preferred embodiments, the solvent/cleaning methods of the present invention comprise use of E-1233zd as a carrier fluid for applications such as lubricants deposition in the hard disk drive industry, silicone/PTFE-based lubricants deposition in the medical industry, and spray adhesives carrier solvent in the adhesive industry Although the invention is illustrated and described herein with reference to specific embodiments, it is not intended that the appended claims be limited to the details shown. Rather, it is expected that various modifications may be made in these details by those skilled in the art, which modifications may still be within the spirit and scope of the claimed subject matter and it is intended that these claims be construed accordingly. All percentages herein are by weight unless otherwise specified.

EXAMPLES

The invention is further illustrated in the following examples that are intended to be illustrative, but not limiting in any manner.

Example 1

Vapor Pressure of 1233xf and E-1233zd

A high-pressure cell equipped with a certified pressure gauge was evacuated by a vacuum pump to remove all permanent gases. 14.21 g of 1233xf and 9.17 g of E-1233zd were then loaded into the cell individually by a stainless steel syringe pump. The high-pressure cell was placed in an orbital shaker in which temperature was controlled at the accuracy of 0.1° C. Pressure was measured at 5, 15, 25, and 35° C. At each temperature the pressure was measured after one hour in order to achieve equilibrium. The accuracy of the pressure gauge was + or –0.1 psia. In order to confirm permanent gases were not interfering with the pressure measurement, ln P was plotted against 1000/T. A good linear fit was achieved with $R^2=0.9999$, indicating no permanent gases were involved. The measured pressure can be seen in Table 1.

TABLE 1

Pressure of 1233xf and E-1233zd

| Temperature | Pressure (psia) | |
|---|---|---|
| (° C.) | 1233xf | E-1233zd |
| 5.0 | 11.5 | 9.1 |
| 15.0 | 16.8 | 13.7 |
| 18.5 | 18.3 | 14.7 |
| 25.0 | 23.8 | 19.7 |
| 35.0 | 32.7 | 27.5 |

The data in table 1 shows that 1233xf has higher pressure than atmospheric pressure of (14.7 psia) within the temperature range 15 to 25° C., indicating 1233xf will be evaporate quickly. This is not desired for solvent applications. E-1233zd exhibits a pressure lower than atmospheric within the temperature range 5 to 15° C.

Example 2

Kauri-Butanol Value of E-1233zd

Kauri-Butanol (Kb) is one of the key parameters that have been used as an indication of solvency. The higher the Kb value, the stronger the solvency. The procedures as described in ASTM D1133 "Standard Test Method for Kauri-Butanol Value of Hydrocarbons" were followed. As comparison, the Kb value of other commonly used solvents, TDCE, trans-1,2-dichloroethylene; F 1411b, 1,1-dichloro-4-fluoroethane; CFC11, trichlorofluoromethane; HCHC 225, and dichloropentafluoropropane were also measured,

TABLE 2

Kb values

| Molecule | Cl/C | Kb |
|---|---|---|
| E-1233zd | 1/3 | 27.0 |
| 1233xf | 1/3 | —* |
| HCFC 225 | 2/3 | 31.0 |
| TDCE | 1 | 112.0 |
| F141 b | 1 | 55.6 |
| CFC11 | 3 | 60.0 |

*Kb value of 1233xf cannot be measured under ASTD D1133 specified conditions because of its fast evaporation rate.

The presence of Cl was thought to contribute to increase solvency for a material. Table 2 shows that E-1233zd exhibits a surprisingly high Kauri-butanol value for a material having only one chlorine. The relatively high Kauri-butanol value for E-1233zd is further surprising where the Kauri-butanol value for 1233xf, also having only one chlorine, could not be measured.

Example 3

Flammability of E-1233zd

Flammability of a solvent is related to safety of its use. For most application, it is desirable that a solvent have as low a flammable as possible. The flammability of E-1233zd was characterized by flash point measured according to ASTM D3278-96. The flash point of TDCE and HCFC 225 were used as comparative examples. Table 3 summarizes the results.

TABLE 3

Flash point of E-1233zd vs. TDCE and HCFC 225

| Molecule | Cl/H | Flash point |
|---|---|---|
| E-1233zd | 1/2 | No |
| TDCE | 1/1 | Yes |
| HCFC 225 | 2/1 | No |

The presence of chlorine is though to reduce flammability of a molecule while hydrogen is though to increase flammability. The data in Table 3 shows that E-1233zd, which has a relatively low ratio of chlorine to hydrogen surprisingly exhibits no flash point.

Example 4

Material Compatibility of E-1233zd with Elastomer

The compatibility of E-1233zd with various elastomers was measured at the boiling point of E-1233zd for more than 72 hours by measuring linear swelling. The results were summarized in Table 4.

TABLE 4

Compatibility of E-1233zd with elastomers

| | Linear Swell (%) | | |
|---|---|---|---|
| Elastomer | E-1233zd | HCFC 225 | CFC 113 |
| Silicone Rubber | 23.0 | 41.5 | 36.6 |
| Natural Rubber | 10.0 | 6.1 | 4.9 |
| EPDM* | 5.0 | –0.1 | 7.9 |

*Ethylene propylene diene terpolymer (EPDM)

E-1233zd showed compatibility with natural rubber and EPDM comparable to HCFC 225 and CFC 113. However, E-1233zd was much more compatible with silicone rubber than HCFC 225 and CFC 113.

Example 5

Degreasing of Lubricant Oil Using E-1233zd

A small quantity of commercial lubricant oil was deposited on the surface of several 30×10 mm stainless steel plates. The mass of each plate was determined with a precision of 0.1 mg before and after deposition. The difference between these two values corresponds to the initial mass of lubricant.

Once the initial mass is obtained, each steel plate is immersed in a beaker filled with a cleaning composition at ambient temperature for 5 minutes. Thereafter, the steel plates were removed from the beaker and dried in the open air for 5 minutes. Thereafter, the mass of each plate was determined to evaluate the percentage of lubricant oil removed during the test. Table 5 summarizes the results.

TABLE 5

Cleaning of Lubricant oil

| | Product tested | |
| --- | --- | --- |
| | E-1233zd | HCFC 141b |
| Tare weight (g) | 5.3088 | 5.7456 |
| Weight of steel plate with pollutant (g) | 5.3855 | 5.8306 |
| Weight of dried plate after cleaning (g) | 5.3095 | 5.7459 |
| Removal rate (%) | 99.10 | 99.60 |

E-1233zd exhibited cleaning results comparable results to HCFC 141b.

Example 6

Cleaning of Silicone Oil

A procedure similar to Example 5 was followed using silicon oil. The results were summarized as in Table 6

| | Product tested | |
| --- | --- | --- |
| | E-1233zd | HCFC 141b |
| Tare weight (g) | 5.3088 | 4.5335 |
| Weight of steel plate with pollutant (g) | 5.3855 | 4.5970 |
| Weight of dried plate after cleaning (g) | 5.3095 | 4.5345 |
| Removal rate (%) | 99.10 | 98.40 |

E-1233zd showed cleaning result better than HCFC 141b.

Example 7

1233zd and Alcohols: Defluxing

A small quantity of commercial solder flux was deposited on the surface of several 30×10 mm stainless steel plates. The mass of each plate was determined with a precision of 0.1 mg before deposition and corresponds to the tare. The plates wee heated to 250° C. until fusion of the metal from the solder flux (between 1 and 2 min). The metal could then be easily removed from the plates and only the flux remained on them.

The plates prepared with this method were dried in the open air at ambient temperature for 16 hours. The mass of each dried plate was determined with a precision of 0.1 mg before and after deposition. The difference between these two values corresponds to the initial mass of flux.

Once the initial mass was obtained, half of the steel plates are immersed in a beaker filled with a cleaning composition at ambient temperature for 30 minutes and the other half of the plates immersed in a beaker filled with the cleaning solution for 60 minutes. After the immersion, the steel plates were removed from the beakers and dried in the open air for 5 minutes. Thereafter, the mass of each plate was determined to evaluate the percentage of flux removed during the test. Table 7 summarizes the results.

TABLE 7

Defluxing of solder flux

| Product tested | E-1233zd (90%) + Isopropanol (10%) | E-1233zd | HCFC-141b (96%) + Methanol (4%) |
| --- | --- | --- | --- |
| Tare weight (g) | 12.2926 | 12.1663 | 12.2757 |
| Weight of steel plate with flux (g) | 12.3956 | 12.2648 | 12.3379 |
| Weight of dried plate after 30 min cleaning (g) | 12.3050 | 12.2293 | 12.2794 |
| Weight of dried plate after 60 min cleaning (g) | 12.3026 | 12.2094 | 12.2782 |
| Removal rate for 30 mn (%) | 87.96 | 36.04 | 94.05 |
| Removal rate for 60 mn (%) | 90.29 | 26.24 | 95.98 |

Example 8

1233zd and Esters

A procedure similar to Example 5 was followed using commercial natural mineral oil for high pressure. The results were summarized in Table 8

TABLE 8

Cleaning of Mineral oil

| Product tested | E-1233zd | 1,2-transdichloroethylene | Methyl acetate | E-1233zd (67%) + 1,2-transdichloroethylene (17%) + methyl acetate (16%) |
| --- | --- | --- | --- | --- |
| Tare weight (g) | 5.4800 | 5.7453 | 5.1794 | 5.7453 |
| Weight of steel plate with oil (g) | 5.5939 | 5.9045 | 5.2855 | 5.8453 |
| Weight of dried plate after cleaning (g) | 5.5287 | 5.7636 | 5.2519 | 5.7492 |
| Removal rate (%) | 57.2 | 88.51 | 31.67 | 96.1 |

The compositions of E-1233zd with 1,2-transdichloroethylene and methyl acetate showed unexpected better cleaning result than each component alone.

Example 9

Evaporator Cleaning

An evaporator from a refrigeration system contains a known quantity of 300 SUS mineral oil. The evaporator could be flushed with flushing agent for 10 minutes at ambient temperature. Following the flushing period, the quantity of oil and residue removed would be determined. This could be done by measuring the weight of the evaporator following flushing and evacuation of flushing agent and/or by stripping the flushing agent from the removed oil and residue and weighing that. HFC-245fa and trans-HCFO-1233zd would be used as flushing agents. It is expected that trans-HCFO-1233zd would be found to remove a greater percentage of the oil and residue during the flushing period than HFC-245fa.

Example 10

Residual

To a clean evaporator from an air conditioning, a measured quantity of flushing liquid would be added to simulate conditions following an open-loop evaporator flushing procedure. The evaporator would be maintained at 25° C. with a slow flow of air passing through the evaporator to assist in drying. The evaporator would be dried such as for 10 minutes and then weighed to measure the quantity of flushing agent remaining. This procedure would be performed with trans-HCFO-1233zd and with cis-HCFO-1233zd, where it is expected that more cis-HCFO-1233zd would remain after the drying period than the trans-HCFO-1233zd.

It is contemplated that numerous varieties and types of vapor degreasing equipment are adaptable for use in connection with the present methods. The present solvent/cleaning methods may also comprise cold cleaning in which the contaminated article is either immersed in the fluid composition of the present invention under ambient or room temperature conditions or wiped under such conditions with rags or similar objects soaked in solvents/cleaners.

The invention claimed is:

1. A solvent/cleaner composition consisting of the hydrochloroolefin 1233zd and an alcohol selected from the group consisting of methanol, ethanol and iso-propanol wherein the hydrochlorofluorolefin 1233zd comprises about 70 wt % or more the trans steroisomer of hydrochloroolefin 1233zd, wherein said solvent/cleaner composition has a Kauri-butanol value of greater than about 15.

2. The solvent/cleaner composition of claim 1 wherein said hydrochlorofluoroolefin 1233zd comprises about 90 wt % or more said trans stereoisomer.

3. The solvent/cleaner composition of claim 1 wherein said hydrochlorofluoroolefin 1233zd comprises about 97 wt % or more said trans stereoisomer.

4. The solvent/cleaner composition of claim 1, further comprising hydrofluorocarbons, hydrofluoroolefins, hydrocarbons, ethers, hydrofluoroethers, esters, ketones, 1,2-trans-dichloroethylene and mixtures thereof.

5. The solvent/cleaner composition of claim 4 wherein said ester is selected from the group consisting of methyl formate, methyl acetate, ethyl formate and ethyl acetate.

6. The solvent/cleaner composition of claim 1 having a Kauri-butanol value of eater than about 20.

7. A method of removing contaminates from a surface comprising contact said surface with a liquid and/or vapor comprising the hydrochlorofluoroolefin 1233zd and an alcohol wherein said hydrochlorofluoroolefin 1233zd comprises 70 wt % or more the trans stereoisomer of hydrochlorofluoroolefin 1233zd.

8. The method of claim 7 wherein said liquid and/or vapor comprises about 90 wt % or more said trans stereoisomer.

9. The method of claim 7 wherein said liquid and/or vapor comprises about 97 wt % or more said trans stereoisomer.

10. The method of claim 7 wherein said alcohol is selected from the group consisting of methanol ethanol and iso-propanol.

11. The method of claim 7 wherein said liquid and/or vapor further comprising hydrofluorocarbons, hydrofluoroolefins, hydrocarbons, ethers, hydrofluoroethers, esters, ketones, and mixtures thereof.

12. The method of claim 7 wherein said ester is selected from the group consisting of methyl formate, methyl acetate, ethyl formate and ethyl acetate.

13. The method of claim 7 wherein said liquid and/or vapor has a Kauri-butanol value of greater than about 15.

14. The method of claim 7 wherein said liquid and/or vapor has a Kauri-butanol value of greater than about 20.

* * * * *